Patented June 17, 1947

2,422,392

UNITED STATES PATENT OFFICE 2,422,392

ETHYLENE-VINYL CHLORIDE POLYMERS

Merlin Martin Brubaker, Boothwyn, Pa., John Richard Roland, McDaniel Heights, Del., and Merlin Dewey Peterson, Oak Ridge, Tenn., assignors to E. I. du Pont de Nemours & Company, Wilmington, Del., a corporation of Delaware No Drawing. Application October 2, 1943,
Serial No. 504,760

5 Claims. (Cl. 260—86)

This invention relates to an improved process for the preparation of ethylene polymers, and particularly to an improved process for preparing ethylene-vinyl chloride polymers in the presence of a buffered peroxide catalyst.

Ethylene-vinyl chloride polymers are disclosed in U. S. Patent 2,200,429. In copending application S. N. 452,892 of M. D. Peterson, filed July 30, 1942, now U. S. Patent 2,388,178, it is disclosed that ethylene polymers may be prepared by subjecting ethylene to elevated temperatures and pressures in the presence of polymerization-favoring quantities of free oxygen, water, and an alkali.

An object of this invention is to provide an improved process for preparing uniform, high quality ethylene-vinyl chloride polymers. Another object is to control the vinyl chloride content of ethylene-vinyl chloride polymers during their preparation. A final object is to advance the ethylene polymer art.

These and other objects are accomplished in accordance with the present invention by polymerizing ethylene and vinyl chloride in the presence of an organic peroxide and an oxidizable sulfoxy compound, at carefully controlled pH in the alkaline range, and at pressures which may be as low as 5 atmospheres and which are maintained at desired levels during the polymerization.

We have discovered that improved, uniform, ethylene-vinyl chloride polymers are obtained if the alkaline polymerization of ethylene and vinyl chloride in the presence of an organic peroxide is conducted in the presence of buffer salts which control pH within about 3.0 pH units during the polymerization reaction. We have also discovered that the polymerization of ethylene with vinyl chloride can be conducted at pressures as low as 5 atmospheres, particularly when an alkaline buffer is employed. We have discovered further that the polymerization is assisted by the presence of an oxidizable sulfoxy compound, to be hereinafter described.

By an oxidizable sulfoxy compound is meant sulfur dioxide and compounds containing a sulfur-oxygen bond and which are capable of yielding sulfurous acid when treated with an acid having a higher ionization constant than sulfurous acid.

The monomers used for the preparation of polymers in accordance with this invention should be essentially free of interfering impurities such as acetylene and oxygen. Preferably the molecular oxygen content of the monomers should be as low as it is possible to attain, although up to 1200 parts per million may be tolerated. The polymerization is generally effected in a deoxygenated aqueous menstrum.

The organic peroxides which are used as catalysts include the diacyl peroxides such as diacetyl peroxide, dibenzoyl peroxide, dilauroyl peroxide, dibenzoyl peroxide and acetyl benzoyl peroxide, and the dialkyl peroxides, such as, diethyl dioxides, ethyl methyl dioxide, etc.

As the alkaline buffer, any water-soluble compound which gives a pH above 7 and preferably in the range from 8 to 11 may be used. Such compounds are borax, sodium carbonate, sodium acetate, disodium phosphate, sodium citrate, sodium benzoate, sodium tartrate and the like. In place of the alkaline buffer salt we may use small amounts of triethanolamine or other similar buffering substances.

Examples of oxidizable sulfoxy compounds are sodium sulfite, sodium bisulfite, sodium hydrosulfite, sodium thiosulfate, "Sulfoxite" C (sodium salt of formaldehydesulfoxylic acid), dialkyl sulfites, e. g., diethyl sulfite, and the like.

The polymerization temperatures used in this invention are within the range 30° C. to 300° C., preferably 50° C. to 300° C. The pressure employed generally exceeds 5 atmospheres and is preferably in the range from 15 to 1500 atmospheres. Pressures as high as 3000 atmospheres, or even higher may be employed. The pressure is maintained within the desired range within the reactor either by injecting water, ethylene, vinyl chloride, or a mixture of ethylene and vinyl chloride.

The proportion by weight of ethylene to vinyl chloride may vary from about 1 to 99 to about 99 to 1. This makes possible the preparation of a wide variety of ethylene-vinyl chloride polymers which, as demonstrated by examples hereinafter given, vary from hard tough molding compositions on the high vinyl chloride side through strong elastomers to tough pliable products on the high ethylene side. It is usually convenient to employ from 0.1 to 50 parts (preferably 0.2 to 5.0 parts) by weight of water per part of total polymerizable monomers. If desired, a portion of this water may be replaced by an organic solvent such as benzene, chlorobenzene, or tertiary butyl methyl ether.

The amount of catalyst which may be used is generally 0.0001% to 5.0% of the weight of the monomers, preferably 0.001% to 0.5%. The buffer salt is employed in quantity to give the desired pH, and this varies with the particular salt used. Generally, however, from 0.25% to 1.0%, based on the weight of monomers, is sufficient. The reducing salt may be present in quantity up to about 1% of the weight of monomers, although from 0.001% to 0.1% is generally sufficient.

The pH may be within the range between 7 and 11, but it is desirable, as stated above, that a constant pH be maintained. At low polymerization temperatures particularly at 30° C. to 75° C. this is not difficult since the rate of formation of soluble chlorides at these temperatures is so slow that a suitable buffer, such as borax, added prior to the start of the polymerization can adequately maintain the pH at about 7.5 to 9.0. At higher polymerization temperatures it is preferable to maintain the pH at a lower level, namely about 7.0 to 8.5, thus decreasing the rate of formation of soluble chlorides. In the latter case it is possible to keep the pH within the desired range by frequent addition of small portions of the buffer salt.

Polymers containing a high ratio of vinyl chloride to ethylene are most conveniently prepared at relatively low pressures, in accordance with this invention, usually in the range of 5 to 50 atmospheres. Polymers containing a high ratio of ethylene to vinyl chloride are best prepared at high pressures, preferably in the range of 500 to 1500 atmospheres. At pressures lower than 5 atmospheres, the polymers obtained closely resemble polyvinyl chloride, although small amounts of ethylene are combined in the polymers even under such low pressure conditions.

The following examples will serve further to illustrate our invention.

*Example 1.*—A stainless steel-lined shaker tube having a capacity of 400 cc. is charged with 140 grams of water, 0.2 gram of benzoyl peroxide, and 1.0 gram of borax. The pH of this mixture is 8.9. The shaker tube is then closed, evacuated, cooled, and 60 grams of vinyl chloride are weighed in. The vessel is placed in a shaker machine provided with a heater, ethylene is injected into the shaker tube until a pressure of 600 atmospheres is reached, and heating and agitation are started. During a reaction time of 16 hours, throughout which the temperature is maintained at 73° C. to 76° C. and the pressure within the range of 840 to 965 atmospheres by intermittent injection of ethylene, there is a total observed pressure drop of 610 atmospheres. The shaker tube is thereafter cooled, disconnected from the ethylene reservoir, removed from the shaker machine, opened, and the contents discharged. The product thus obtained has a pH of 8.8 and yields 60 grams of an ethylene-vinyl chloride polymer which contains 32.6% chlorine. From this analysis it may be calculated that the polymer contains 57.3% by weight of vinyl chloride.

*Example 2.*—A stainless steel-lined shaker tube having a capacity of 400 cc. is charged with 140 grams of water, 0.2 gram of benzoyl peroxide, and 1.0 gram borax. The pH of this mixture is 9.0. The shaker tube is closed, evacuated, and 25 grams of vinyl chloride are added, after which the vessel is pressured to 600 atmospheres with ethylene. During a reaction time of 16.25 hours, throughout which temperature is maintained at 75° C. to 76° C. and the pressure within the range 830 to 980 atmospheres by intermittent injection of ethylene, there is a total observed pressure drop of 460 atmospheres. The shaker tube is thereafter cooled, bled free of excess gas, opened, and the contents discharged. The reaction product has a pH of 7.6. The polymer thus obtained is freed of water by milling on a small rubber mill. In this way an elastomeric substance with a waxy feel is obtained. Its chlorine content is 20.9%, which corresponds to a vinyl chloride content of 36%.

*Example 3.*—A stainless steel-lined shaker tube having a volume of 400 cc. is charged with 140 grams of water, 0.2 gram of benzoyl peroxide, and 1.0 gram of borax. The pH of this mixture is 8.9. The shaker tube is closed, evacuated, and 60 grams of vinyl chloride are added. Ethylene is then injected until the total pressure reaches 6.8 atmospheres. The reactor is placed in a shaking machine, and heating and agitation are started. During a reaction time of 16.5 hours, throughout which temperature is maintained at 75° C. and the pressure at 11.9 to 19.7 atmospheres by intermittent injection of ethylene, there is a total observed pressure drop of 9.9 atmospheres. The reaction product, which has a pH of 8.7, yields 24 grams of an ethylene-vinyl chloride polymer, which corresponds to a vinyl chloride content of 96.1%. This polymer has a softening point of 69° C.

*Example 4.*—A stainless steel-lined shaker tube having a volume of 400 cc. is charged with 140 grams of water, 0.2 gram of benzoyl peroxide, and 1.0 gram of borax. The pH of this mixture is 8.8. The shaker tube is evacuated and is then charged with 120 grams of vinyl chloride and 80 grams of ethylene. During a reaction period of 13 hours throughout which the temperature is maintained at 75° C. to 77° C., and the pressure within the range 850 to 985 atmospheres by periodic injection of deoxygenated water, there is a total pressure drop of 1185 atmospheres. The reactor is thereafter found to contain 68 grams of a polymer containing 42.4% chlorine, which corresponds to a vinyl chloride content of 74.7%. Pressed films of this polymer are exceptionally pliable and strong, and have a high degree of elasticity.

*Example 5.*—Into a stainless steel-lined shaker tube having a capacity of 400 cc. is placed 100 grams of water, 0.2 gram of benzoyl peroxide, 1.0 gram of borax, and 0.1 gram of sodium formaldehyde sulfoxylate. The pH of the charge is 8.75. The shaker tube is closed, evacuated, cooled, and charged with 150 grams of vinyl chloride and 100 grams of ethylene. Heating and agitation are started. During a reaction time of 7.75 hours, throughout which the temperature is maintained at 75° C. and the pressure in the range of 750 to 960 atmospheres by periodically injecting deoxygenated water into the reactor, there is a total pressure drop of 825 atmospheres. The reactor is cooled, bled of excess gas, opened, and discharged. The reaction mixture has a pH of 9.2. From the reaction mixture there is recovered 90 grams of ethylene-vinyl chloride polymer containing 46.1% chlorine, which corresponds to a vinyl chloride content of 81%. The polymer is light colored, strong, and highly elastic.

The equipment in which ethylene-vinyl chloride polymers are prepared in accordance with this invention consists essentially of a pressure resisting vessel made of or lined with stainless steel, aluminum, silver, tin, lead, glass, enamel or other substances which do not have an adverse effect on the polymerization reaction. High tensile chrome-vanadium steel, or other mild steel, may be employed, particularly if the reactor is pretreated, i. e. thoroughly cleaned of inhibitors by contacting with hydrogen peroxide, by polishing, of by continued use in peroxide-catalyzed polymerization systems. The process may be conducted either batchwise or continuously. Agitation is generally provided by shaking or stirring devices, or by inducing turbulent flow in continuous systems.

Various changes may be made in the details of this invention without departing therefrom or sacrificing any of the advantages thereof. For example, it is possible to prepare ethylene-vinyl chloride polymers containing a third polymer component by introducing the monomer of such third component into the polymerization mixture, and conducting the polymerization reaction as hereinbefore described. The third component should not be used in amount exceeding 10 mole percent of the total monomers.

We claim:

1. In a process for preparing polymers the steps which comprise charging a reactor with 0.1 to 50 parts by weight of water, 0.0025 to 0.10 part of alkaline buffer salt, 0.000001 to 0.05 part of an organic peroxide, 1.0 part of monomers consisting of ethylene and vinyl chloride in weight ratio between 99 to 1 and 1 to 99, 0.00001 to 0.001 part of reducing salt of the group consisting of sulfites, bisulfites, hydrosulfites, and formaldehyde sulfoxylates, and carrying on the polymerization at 30° C. to 300° C. while maintaining pressure at 5 to 3000 atmospheres.

2. A process for preparing ethylene-vinyl chloride polymers which comprises heating 100 parts by weight water, 0.2 parts benzoyl peroxide, 1.0 part borax, 0.1 part sodium formaldehyde sulfoxylate 150 parts vinyl chloride and 100 parts ethylene at 75° while maintaining a reaction pressure of 750 to 960 atmospheres.

3. In a process for producing ethylene-vinyl chloride polymers the step which comprises carrying on the polymerization at a temperature within the range of 30° C. to 300° C. under 5 to 3000 atmospheres pressure in the presence of an organic peroxide catalyst, 0.1 to 50 parts by weight of water per part of monomers, a buffer capable of maintaining the pH of the reaction mixture within the range 7 to 11, and a reducing salt of the group consisting of sulfites, bisulfites, hydrosulfites, and formaldehyde sulfoxylates, the quantities of organic peroxide and reducing salt being 0.0001 per cent to 5.0 per cent, and 0.001 per cent to 1 per cent, respectively, based on the combined weight of ethylene and vinyl chloride initially present.

4. A process for preparing ethylene-vinyl chloride polymers which comprises heating ethylene with vinyl chloride in the presence of 0.1 to 50 parts by weight of water per part of monomers, an organic peroxide, and a reducing salt selected from the group consisting of sulfites, bisulfites, hydrosulfites, and formaldehyde sulfoxylates, at 30° C. to 300° C. under 5 to 3000 atmospheres pressure, while the pH is maintained constant at 7.5 to 9.0 by means of an alkaline buffer salt, the quantities of organic peroxide and reducing salt being 0.0001 per cent to 5.0 per cent, and 0.001 per cent to 1 per cent, respectively, based on the combined weight of ethylene and vinyl chloride initially present.

5. In a process for producing ethylene-vinyl chloride polymers the step which comprises heating monomeric ethylene and vinyl chloride with 0.1 to 50 parts by weight of water per part of the said monomers at 15 to 1500 atmospheres pressure and at a temperature from 50° C. to 200° C. at a pH within the range between 7 and 11, and in the presence of an organic peroxide, a buffer salt capable of controlling the pH within maximum and minimum limits which differ by no more than 3 pH units, in the presence also of a reducing salt of the group consisting of sulfites, bisulfites, hydrosulfites and formaldehyde sulfoxylates, while maintaining pressure within the reactor by injection of water as the polymerization reaction progresses, the quantities of organic peroxide and reducing salt being 0.0001 per cent to 5.0 per cent, and 0.001 per cent to 1 per cent, respectively, based on the combined weight of ethylene and vinyl chloride initially present.

MERLIN MARTIN BRUBAKER.
JOHN RICHARD ROLAND.
MERLIN DEWEY PETERSON.

REFERENCES CITED

The following references are of record in the file of this patent:

UNITED STATES PATENTS

| Number | Name | Date |
|---|---|---|
| 1,896,491 | Luther | Feb. 7, 1933 |
| 2,187,146 | Calcott | Jan. 16, 1940 |
| 2,200,429 | Perrin | May 14, 1940 |
| 2,334,195 | Hopff | Nov. 16, 1943 |
| 2,342,400 | Hopff | Feb. 22, 1944 |
| 2,388,225 | Brooks et al. | Oct. 30, 1945 |

OTHER REFERENCES

Whitby, Rubber Chem. and Technology, vol. 7, Jan. 1934; pp. 65–67.

Mark, High Polymers, vol. III, 1941; pp. 81–83.